Oct. 27, 1970          J. E. VAN NEST          3,536,573
METHOD OF TREATING FABRIC LAMINATES IN A LIQUID
MEDIA AND THE ARTICLE FORMED THEREBY
Filed Nov. 15, 1967
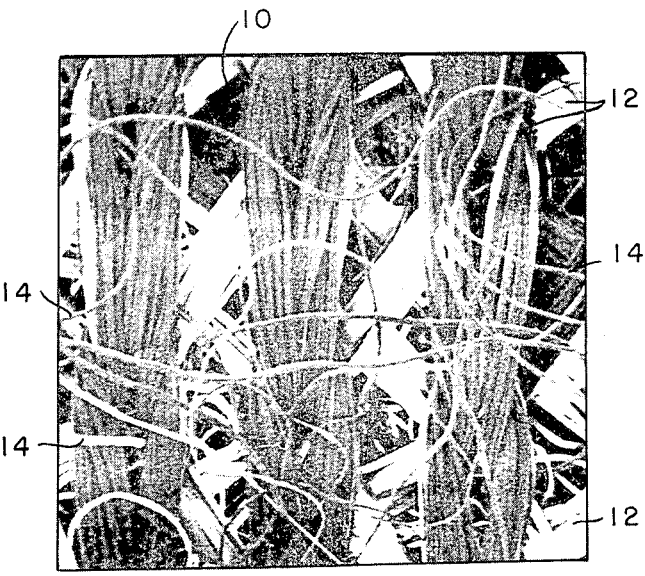
FIG.-1-
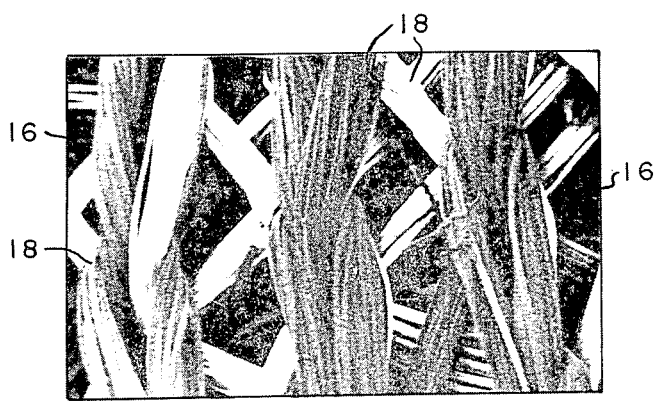
FIG.-2-
INVENTOR
JOHN E. VAN NEST
BY Armand P. Boisselle
ATTORNEY United States Patent Office 3,536,573
Patented Oct. 27, 1970

3,536,573
METHOD OF TREATING FABRIC LAMINATES IN A LIQUID MEDIA AND THE ARTICLE FORMED THEREBY
John E. Van Nest, Berkeley, N.J., assignor to Deering Milliken Research Corporation, Spartanburg, S.C., a corporation of South Carolina
Filed Nov. 15, 1967, Ser. No. 683,219
Int. Cl. B32b 5/26; D06c 29/00; D06p 7/00
U.S. Cl. 161—89     6 Claims

ABSTRACT OF THE DISCLOSURE

A laminated article comprising an outer layer of a woven or knited fabric and an inner layer of a knitted fabric and having sufficient fiber ends extending from the outer layer in a random manner into the inner knitted layer to improve the hand of the laminated article. The process for forming the laminate and treating the same may include bonding fabrics together with an adhesive and working the laminate in a liquid medium to form the projecting fiber ends.

Background of the invention

This invention relates to laminated articles, and more particularly to laminated articles having improved hand and drape. The invention further relates to a laminated fabric composition comprising an outer layer of a woven or knitted fabric and an inner layer of a knitted fabric wherein sufficient fiber ends extend from the outer layer in a random manner into the inner knitted layer.

The use of laminated fabrics for the preparation of wearing apparel and other textile articles has increased significantly in recent years. This interest in laminated fabrics has been generated by the unusual and desirable properties exhibited by such fabrics. For example, it is possible to prepare wearing apparel from a combination of two or more types of fabrics and obtain the desirable properties of each of the fabrics in a single garment. Such results are not obtained when two or more fabrics are combined by sewing since there is little or no interaction between the successive layers which have been sewn. Moreover, the necessary separate cutting and sewing steps involved in these processes add to the complexity and expense of the operation.

These problems have been overcome to some extent by bonding the successive layers together with an adhesive. In this manner, there is considerable interaction between the layers resulting in improved properties such as drape and wrinkle resistance. In some instances, however, even the bonded laminated fabrics do not exhibit all the desirable properties. It has been found, for example, that a laminated fabric obtained by bonding two similar fabrics such as woven fabrics possessed a considerable propensity for wrinkling due to the apparently uneven distortion of the two layers. Such uneven distortions result from non-uniform bonding of the two layers as well as reaction to the environment, especially to moisture and heat.

The unique advantages of laminated fabrics are maximized when a knitted fabric is combined with knitted or woven fabrics, and especially when a knitted fabric is combined with a woven fabric. The laminated fabric possesses all the desirable properties of a woven fabric and the additional warmth and improved drape characteristics imparted by the bonded knitted fabric. Knitted fabrics are characterized by being expandable in several directions, and, therefore, are extremely useful as backing or lining material which should expand or contract to conform to the changes in the outer material.

Knitted fabrics are prepared from spun or filament yarns. Either fabric has been used as backing material in the preparation of laminated fabrics. Although these fabrics possess the desirable ability to expand and contract with the outer layer, they suffer the disadvantage of poor hand. That is, the knitted fabrics, especially those obtained from filament yarns, have a slick hand which may be objectionable.

The increase in the use of laminated fabrics in the preparation of articles of wearing apparel also has been hampered to some degree by the problems involved in dyeing and color matching of the two or more layers comprising the laminated article. Heretofore, it has been necessary to dye the fabrics individually before bonding. This procedure is undesirable since it often creates serious problems in the matching of the colors since the knitted and woven fabrics are generally prepared from different yarns. Furthermore, this procedure necessitates the accumulation of a sizable inventory of dyed fabrics.

Summary of the invention

These problems have been overcome by providing a laminated article comprised of an outer layer of a woven or knitted fabric and an inner layer of a knitted fabric wherein sufficient fiber ends extend from the outer layer into the inner layer to improve the hand of the laminated article. Such laminated articles are obtained by bonding the layers to each other and thereafter working the bonded fabric to cause sufficient fiber ends to extend from the outer layer in a random manner into the inner knitted layer.

Brief description of the drawings

FIG. 1 is a view (magnified 48 times) of a laminated fabric of this invention composed of an outer layer of a woven wool fabric 10 and an inner layer of a knitted acetate tricot 12, and randomly distributed wool fiber ends 14 in the knitted layer.

FIG. 2 is a view (magnified 48 times) of a laminated fabric obtained by bonding a dyed woven wool fabric 16 to a dyed knitted acetate tricot fabric 18.

Description of the preferred embodiments

The outer layer of the laminated article can be either a woven or knitted fabric comprised of natural fibers, synthetic fibers, and blends thereof. The natural fibers include the cellulosic and protein fibers such as cotton, flax, ramie, wool, alpaca, vicuna, mohair, cashmere, camel hair, Llama, fur and silk. Examples of synthetic fibers include polyamides, such as polyhexamethylene adipamide, polyesters such as polyethylene terephthalate; acrylic fibers such as acrylonitrile, homopolymers or copolymers of acrylonitrile, such as acrylonitrile/methyl acrylate (85:15) and cellulosic derivatives such as cellulose acetate and viscose rayon. Examples of fabrics composed of blends of natural and synthetic fibers include the following: Fortrel polyester/cotton (50:50); Dacron polyester/cotton (65:35); Dacron polyester/wool (65:35); and Acrilan/wool (55:45).

The preferred fabric for use as the outer layer of the laminated article of this invention is a woven fabric prepared from spun yarn, although circular knits and Raschel fabrics are useful also. The nature of spun yarn provides for a large number of fiber ends which are capable of extending from the woven layer in a random manner into the inner knitted layer. It is the presence of these fiber ends in the knitted layer which accounts for the improved aesthetic properties.

The inner layer utilized in the preparation of the laminated articles of this invention are preferably knitted fabrics obtained from either spun or continuous filament yarns. The invention exhibits its greatest advantage when the inner knitted layer is prepared from continuous filament yarns since these yarns generally exhibit a slick or slippery hand. Such properties are to be avoided where the inner layer serves as a lining in an article of wearing apparel. Natural and synthetic fibers may be utilized in the preparation of the inner knitted fabric. Such fibers include cotton, nylon, polyester, polyamide, cellulose acetate, rayon and viscose rayon. Knitted tricot fabrics such as acetate tricot, nylon tricot and rayon tricot are particularly useful inner fabrics.

The inner and outer layers of fabric are bonded together by an adhesive substance which is capable of withstanding subsequent working treatments. The adhesive may be applied to the fabrics as a liquid or may be applied in the form of threads or non-woven fabrics which are thermoplastic and possess latent adhesive properties. The adhesive utilized to bond the fabrics is preferably one which will cure to a water-insoluble adhesive, especially where the working of the fabric is effected in an aqueous medium. The elastomers which are soluble or dispersible in a liquid carrier are especially useful and these include those elastomers prepared from acrylates, urethanes and vinyl acetates. Polyurethane adhesives are solvent based and are cured at room temperature. On the other hand, acrylic adhesives are water based and are cured at elevated temperatures, usually from one to three minutes at 120–150° C.

In the process of this invention, the adhesive is applied to portions only of the meeting surfaces of the fabrics to be laminated. That is, the adhesive is not applied as a continuous filament or layer, but rather, in a discontinuous manner such as in a checker board or plaid-like pattern. Alternatively, the adhesive composition may be applied in the form of substantially discrete nodules or blotches.

The adhesive can be applied to one or both of the fabrics to be laminated by any of the known methods such as from a blanket or belt, gravure rollers, or through a spray. Of these methods, the gravure roll and spray techniques are preferred for applying adhesive in some predetermined pattern of dots, squares, blotches, stripes, etc. The thickness of the applied adhesive may vary from 0.003 to about 0.030 inch. One important aspect of the application of the adhesive is the rheology of the adhesive itself. The rheology of adhesives can be varied by the use of different thickening agents. Self-reactive acrylic resins can be thickened by the addition of a methyl cellulose such as Methocel 4000 (available from Dow Chemical Company). This is an inert neutral thickener which does not inhibit cross-linking of the acrylic emulsion. Also useful as thickeners are acid containing acrylic emulsions which thicken on the addition of a basic substance such as ammonia.

The amount of adhesive applied to the fabric is not critical although enough adhesive should be supplied to provide a satisfactory bond between the layers of the laminate. Generally about 2.5 to about 25% by weight of the adhesive based on the weight of the fabric is used.

The fabric layers may be bonded together by applying the adhesive to either or both of the fabrics and thereafter pressing the layers together by any known method such as by passing the fabric through a nip roller. The laminated fabric is then passed into a drying unit which will vary according to the type of adhesives used. If polyurethane adhesives are used, all that is required is sufficient heat to drive off the solvent and a simple hot air oven will suffice. When acrylics are used, more heat is required since the water must first be driven off and then the adhesive cured. Also, since acrylic adhesives are water based and generally low tack adhesive it is usually necessary to ensure that the two layers of fabric cannot move in relation to each other until all or most of the water has been driven off. Because of this, drum and belt dryers are preferred.

As can be seen in FIG. 1, the laminated articles of this invention are characterized further in that there are sufficient fiber ends 14 extending from the outer layer into the inner knitted layer to improve the hand of the laminated article. The fiber ends are those which extend into the inner knitted layer in a random manner and which lie essentially in the plane of the inner knitted fabric. Generally, the fiber ends extending into the inner knitted fabric represent from about 0.01 to about 10% by weight, of the weight of the inner knitted layer of the laminated article, and preferably from about 0.1 to about 5% by weight.

Laminated articles having the characteristics described above are prepared by the process which comprises bonding the layers of fabric to each other and thereafter working the bonded fabric to cause the fiber ends to extend in a random manner from the outer layer into the inner knitted layer. By the term "working" is meant any of the usual finishing operations which subject the fabric to externally applied forces such as twisting and beating in air or in liquid media. Examples of such processes include dyeing, bleaching, dry cleaning, scouring, crabbing, fulling and milling. Wet finishing operations such as dyeing or beating in an aqueous medium are particularly preferred methods of working the bonded fabrics since the liquid media appear to facilitate and accelerate the extension of the fiber ends into the inner knitted layer. Piece-dyeing machinery such as the dyebeck types wherein the piece to be dyed is sewed end-to-end over a driven slot reel so that as the reel revolves, the piece moves continuously through the heated dye bath contained in a tank, is a particularly useful method of working the laminated fabrics. Modified dyebecks are described in U.S. Pats. 3,218,833 and 3,128,617. The dyebeck may be filled with water or other liquid medium not containing dyes where it is desired to work the fabric without changing the color of the laminated fabric. On the other hand, this method provides an excellent opportunity to work the fabric in the desired manner and dye both layers of the laminated article at the same time resulting in improved color matching. It is possible also for one skilled in the art of dyeing to select the dyeing medium in such a manner as to selectively dye the two layers differently, or to dye only one layer when the two layers are composed of different types of yarns. Similar effects may be obtained where the fabrics utilized in the preparation of the laminate are comprised of blends of natural and synthetic fibers or filaments. For example, a laminate comprising an outer layer of a woven wool fabric and an inner layer knitted acetate rayon can be subjected to a dye bath containing suitable dyes which will result in the dyeing of the two types of fibers in a different shade of the chosen color.

Although effects such as color matching of the two layers from the laminated article can be accomplished by selectively dyeing the fabrics prior to lamination, the present process offers the advantages, in addition to improved hand, of improved control over the selection and matching of colors, and the further advantage that large amounts of fabrics need not be dyed and inventoried in order to prepare and supply laminated articles of a particular color or color combination. Laminated articles can be prepared from undyed stock, dyed as needed, and shipped to the customer with little or no waste or accumulation of an inventory of dyed fabrics. A difference in the laminated article obtained by the process of this invention as compared to a laminated article prepared from two similar fabrics which are dyed before bonding is demonstrated in FIGS. 1 and 2. FIG. 1 is a photograph of a laminate fabric of this invention, magnified 48 times, prepared by bonding a woven wool fabric 10 to a knitted acetate tricot 12 with an acrylic adhesive applied in a discontinuous manner, and thereafter dyeing the bonded fabric in a boiling dye solution for about 30 minutes. The laminated article obtained in this manner, as can be seen in FIG. 1, is characterized by a significant number of fiber ends 14 extending from the outer layer in a random manner into the knitted layer. On the other hand, the laminated article pictured in FIG. 2, prepared by separately dyeing a woven wool fabric and a knitted acetate tricot which are then bonded with a similar adhesive, is characterized by the absence of any fiber ends extending from the outer woven layer into the inner knitted layer. The inner layer of this latter fabric is further characterized by a slick and slippery hand which is not observed in the former laminated article.

The following examples illustrate the process of this invention for preparing the laminated articles having the desired properties and characteristics. Unless otherwise indicated, all parts and percentages are by weight. In the dyeing procedures, parts and percentages are by weight, based on the total weight of the fabric being dyed.

EXAMPLE 1

A 60 inch wide woven fabric composed of a blend of 85 parts of wool and 15 parts of nylon (10 ounce/linear yard) is laminated to a 60–67 inch wide nylon tricot (11 yards/pound) with an adhesive comprising polyvinyl acetate, dioctyl phthalate plasticizer and citric acid as a catalyst. The adhesive is applied in the form of a checker board pattern, and the fabrics are pressed together between the cans of a laminater maintained at a temperature of about 125° C. while travelling at the rate of 12 yards per minute. The laminated fabric is then cured for 1 to 2 minutes at 150° C.

After laminating and curing, the fabric is placed (approximately 100 yards lengths) in a dyebeck containing water heated to a temperature of 27° C. and containing Glauber's salt (10%) and Univadine W (1%). The fabric is run through this aqueous bath for 15 minutes whereupon the bath is heated to the boiling point. After running the fabric for one hour at this temperature, the bath is cooled by the addition of cold water. The laminated fabric is rinsed by the further addition of water over a period of 60 minutes. The fabric is then scutched, dried while maintaining the fabric at a width of about 63 inches, semi-decated with two minutes of steam followed by three minutes of vacuum, and wound on tubes. The laminated fabric prepared in this manner exhibits a tight bond between the fabric layers and is further characterized by improved drape and hand. The hand of the inner nylon tricot fabric is especially improved.

EXAMPLE 2

A 60 inch wide, woven, all-wool fabric (10 ounce/linear yard) is laminated to a 60–65 inch wide white acetate tricot utilizing the adhesive described in Example 1 applied in the form of dots. The two fabrics are brought together in a laminater travelling at 15 yards per minute at a roll temperature of 150–160° C.

After laminating, the fabric is placed in a dyebeck and the ends of approximately 100 yard lengths of laminated fabric are sewed together around the dyebeck reels so that the fabric will travel in and out of the dyebeck during the working procedure. The dyebeck is filled with an aqueous solution containing 2% Nacconol SL, 10% Glauber's salt, 0.5% Neovadine AN, and 2.5% of sulfuric acid. The fabric is run through this solution for 15 minutes whereupon an acid dye solution, containing the following dyes, is added over a period of 20 minutes.

| | Percent |
|---|---|
| Xylene Light Yellow 2G | 0.052 |
| Alizarin Light Blue 5GL | 0.053 |
| Amacion Yellow L3G | 0.065 |
| Latyl Blue BG | 0.050 |
| Latyl Blue BCN | 0.021 |

The fabric is run through this solution for 20 minutes at a temperature of 27° C., and the solution is thereafter heated to the boiling point at the rate of about one degree per minute. After the solution has been boiling for 30 minutes, a patch of the laminated fabric is sampled and color tested. The fabric is run for an additional one hour while maintaining the dye solution at its boiling point. The solution is then cooled by radiation to a temperature of 82° C., rinsed with cool water for 60 minutes, and dried. The face of the wool portion of the laminated fabric is sheared, and the fabric is then semi-decated using a cycle of two minutes steam followed by three minutes of vacuum. The product obtained in this manner exhibits a strong bond between the wool and acetate tricot layers. A photograph of the acetate tricot layer of this laminated fabric, magnified 48 times, reveals the presence of a substantial number of wool fiber ends extending from the wool layer into the tricot layer as shown in FIG. 1.

EXAMPLE 3

The procedure of Example 2 is repeated except that the acetate tricot fabric is replaced by a knitted, high-modulus, viscose rayon knitted fabric.

EXAMPLE 4

A 100% all-wool fabric as described in Example 2 is laminated to a nylon tricot fabric (60–67 inches wide and 11 yards/pound) utilizing an acrylate adhesive prepared by mixing 400 parts of Rhoplex E-358 (a 60% solids, self-cross-linking acrylic emulsion available from the Rohm & Haas Company), 8 parts of an acid-containing acrylic emulsion copolymer, also available from Rohm & Haas Company under the trade name Acrysol ASE-95, 8 parts of Acrysol ASE-60 (a thickener available from Rohm & Haas Company), 5.5 parts of diammonium hydrogen phosphate, and 0.5 part of a silicone antifoam agent in 41 parts of water. The adhesive is applied in the form of dots which are flattened out as the two layers of fabric are brought together and laminated in a laminater travelling at 12 yards per minute at a roll temperature of 118° C. The laminated fabric is then cured for about two minutes at 145° C.

This laminated fabric is dyed in a dyebeck in accordance with the procedure described in Example 2 utilizing a dye solution containing the following dyes:

| | Percent |
|---|---|
| Xylene Light Yellow 2G | 0.600 |
| DuPont Orange G | 0.140 |
| Alizarin Sapphire BLN | 0.054 |
| Alizarin Light Blue BRP | 0.310 |
| Merpacyl Orange R | 0.260 |
| Merpacyl Yellow 2 GP | 0.260 |

The laminated fabric obtained in this manner exhibits improved drape and hand and is characterized by the presence of a substantial number of random wool fibers in the inner nylon tricot layer.

EXAMPLE 5

The procedure of Example 1 is repeated except that the laminate is prepared from a woven 100% acrilan fabric and an acetate tricoto fabric.

EXAMPLE 6

The procedure of Example 5 is repeated except that the outer layer of the laminate is a knitted cotton and the inner layer is a knitted viscose rayon.

EXAMPLE 7

The procedure of Example 2 is repeated except that the laminated fabric is dyed in the following manner with an acid premetallized dye. The initial aqueous solution contains 2% Nacconol SL and 10% Glauber's salt. After running for 15 minutes, 6.0% of Neolan Blue 3R and 0.490% of Nyasol Bordeaux R is added over a period of 20 minutes. After running for 20 additional minutes, sulfuric acid (8%) is added. The solution is heated to the boiling point at the rate of 1° per minute and maintained at the boiling point for one hour. The solution is cooled slowly to 82° C., and the fabric is rinsed with water for one hour. At this time, the water is heated to 32° C. whereupon diammonium hydrogen phosphate (10%), sodium bicarbonate (5%), and ammonia (2%) is added. The fabric is run through the solution for 15 minutes, rinsed, and dried. The laminated fabric obtained in this manner is the desired product.

As mentioned previously, the laminated articles of this invention having an outer layer of a woven or knitted fabric and an inner layer of a knitted fabric prepared in accordance with the process described in the above examples are found to possess improved drape and hand. These fabrics, converted into garments for consumer use, exhibit all of the desirable properties of laminated fabrics with the additional advantage that the hand of the inner knitted layer is superior to similar fabrics which have been prepared in the usual manner, namely, dyeing the individual layers of the fabric and then bonding. The advantages are especially evident when the inner knitted layer is prepared from filament yarns which are, by nature, slippery and slick and therefore not pleasing to the touch.

That which is claimed is:

1. A process of preparing a laminated article having improved hand and aesthetic properties comprising an outer layer of a woven or knitted fabric and an inner layer of a knitted fabric, the process comprising bonding the layers to each other and thereafter working the bonded fabric in a liquid medium to cause sufficient fiber ends from the outer layer to extend in a random manner into the inner knitted fabric.

2. The process of claim 1 wherein the liquid medium is a dye medium.

3. The product obtained by the process of claim 1.

4. The process of claim 1 wherein the outer fabric is bonded to the inner fabric by means of an adhesive substance applied to portions only of the meeting surfaces.

5. The process of claim 4 wherein the outer fabric is prepared from spun yarn and the inner fabric is prepared from continuous filament yarn.

6. The process of claim 5 wherein the two layers of fabric are bonded with an acrylate, urethane or vinyl acetate adhesive which cures to a water-insoluble adhesive.

References Cited
UNITED STATES PATENTS

| | | | |
|---|---|---|---|
| 667,699 | 2/1901 | Heaton | 28—72.2 XR |
| 2,116,984 | 5/1938 | Seddon | 161—153 XR |
| 2,333,630 | 11/1943 | Amidon | 161—79 XR |
| 2,713,016 | 7/1955 | Weiss | 161—93 |
| 2,835,020 | 5/1958 | Doe | 161—89 XR |
| 3,086,276 | 4/1963 | Bartz et al. | 28—72.2 XR |
| 3,214,819 | 11/1965 | Guerin | 28—72.2 |
| 3,257,262 | 6/1966 | Epstein | 161—89 |
| 3,383,263 | 5/1968 | Storti | 161—97 XR |
| 3,399,108 | 8/1968 | Olson | 161—175 XR |

ROBERT F. BURNETT, Primary Examiner

W. A. POWELL, Assistant Examiner

U.S. Cl. X.R.

8—147; 28—72.3, 76; 156—291; 161—148, 155, 156